(12) United States Patent
Kitano et al.

(10) Patent No.: US 6,503,423 B1
(45) Date of Patent: Jan. 7, 2003

(54) METHOD OF AND APPARATUS FOR CURING AN OPTICAL DISC

(75) Inventors: Ryoko Kitano, Komatsushima (JP); Masami Inouchi, Komatsushima (JP); Masayuki Yoshida, Komatsushima (JP)

(73) Assignee: Kitano Engineering Co., Ltd., Tokushima-ken (JP)

( * ) Notice: Subject to any disclaimer, the term of this patent is extended or adjusted under 35 U.S.C. 154(b) by 211 days.

(21) Appl. No.: 09/591,155

(22) Filed: Jun. 9, 2000

(30) Foreign Application Priority Data

Jun. 11, 1999 (JP) .......................................... 11-164838

(51) Int. Cl.⁷ ............................................. B29D 11/00
(52) U.S. Cl. ................ 264/1.33; 156/275.5; 156/379.8; 264/1.38; 425/174.4; 425/810
(58) Field of Search ............................... 264/1.33, 1.36, 264/1.38, 1.7; 156/273.3, 275.5, 379.8; 425/174.4, 810

(56) References Cited

U.S. PATENT DOCUMENTS

| | | | |
|---|---|---|---|
| 4,877,475 A | | 10/1989 | Uchida et al. |
| 4,990,208 A | | 2/1991 | Kano |
| 4,995,799 A | | 2/1991 | Hayashi et al. |
| 5,197,060 A | | 3/1993 | Yatake |
| 5,364,256 A | | 11/1994 | Lipscomb et al. |
| 5,597,519 A | | 1/1997 | Martin et al. |
| 5,607,532 A | * | 3/1997 | Lostracco ................ 156/273.3 |
| 5,681,634 A | | 10/1997 | Miyamoto et al. |
| 5,716,761 A | | 2/1998 | Iida et al. |
| 5,779,855 A | | 7/1998 | Amo et al. |
| 5,785,793 A | | 7/1998 | Arai et al. |
| 6,108,933 A | * | 8/2000 | Vromans et al. ......... 156/275.5 |

FOREIGN PATENT DOCUMENTS

JP    61139956    6/1986

OTHER PUBLICATIONS

Drawings from U.S. application Ser. No. 09/322 489, entitled "Method of Manufacturing Optical Disks" (7 sheets).

* cited by examiner

Primary Examiner—Mathieu D. Vargot
(74) Attorney, Agent, or Firm—Flynn, Thiel, Boutell & Tanis, P.C.

(57) ABSTRACT

A method of and apparatus for curing an optical disc capable of efficiently curing ultraviolet curing resin serving as an adhesive between a pair of disc substrates. The apparatus includes a peripherally located ultraviolet irradiation unit disposed around a rotary holding table for irradiating ultraviolet from the peripheral surface of the optical disc toward the inner portion thereof so as to cure the ultraviolet curing resin, and/or a central irradiation unit disposed to irradiate ultraviolet from the central hole of the optical disc toward the outer portion thereof.

19 Claims, 8 Drawing Sheets

METHOD OF AND APPARATUS FOR CURING AN OPTICAL DISC

BACKGROUND OF THE INVENTION

1. Field of the Invention

The invention relates to a method of and an apparatus for curing an optical disc D, more particularly to a method of and an apparatus for curing an ultraviolet curing resin R efficiently and uniformly, which resin is sandwiched between two disc substrates constituting the optical disc D.

2. Description of the Related Art

Generally, an optical disc D has an information signal therein such as an image, sound, or the like which is transferred onto one side of a disc substrate made of polycarbonate in the form of signal pits (signal holes).

In a relatively simple structure of an optical disc D, a metallic reflection film made of, e.g. aluminum, is provided on the surface of the signal pits, and a protection film such as an ultraviolet curing resin R film is formed on the metallic reflection film for preventing damage to the metallic reflection film.

However, as an optical disc D, such as a DVD, having a large storage capacity for information has recently become popular, the structure of disc substrates constituting the optical disc D is multilayered and becomes complex.

For example, in a random access memory type DVD, a twin surassite, a tellurium layer, a reflection film, a protection film and so forth are formed on the resin substrate.

Further, if the structure of the disc substrate becomes complex, there occurs a case where ultraviolet does not at all pass through the disc substrate.

Meanwhile, an optical disc D is formed of a first substrate to which information is applied as mentioned above, and a second disc substrate which are bonded to each other using an ultraviolet adhesive. A method of bonding these two disc substrates is described simply hereinafter.

An ultraviolet curing resin R is first applied to at least one of two disc substrates at the portion where it is joined with another disc substrate so as to bond two disc substrates.

After the adhesive is applied to the joining portion of the two disc substrates, both the disc substrates are rotated while they are bonded, then the ultraviolet curing resin R is distributed or developed uniformly between the two disc substrates.

Thereafter, ultraviolet is irradiated from the upper portion of the disc substrate so as to cure the adhesive, thereby obtaining an optical disc D formed of the two disc substrates which are bonded firmly.

When disc substrates have a complex structure through which ultraviolet does not transmit, even if ultraviolet is irradiated from the upper portion of the optical disc D, the ultraviolet curing resin R serving as an adhesive is not cured.

Even if disc substrates through which ultraviolet hardly transmits are used, if characters or patterns are printed on the disc substrates, there occurs a lack of uniformity when ultraviolet transmits through the disc substrates, so that the ultraviolet curing resin R is not efficiently and uniformly cured.

If there occurs a problem in the curing of the ultraviolet curing resin R, it causes the occurrence of strain or distortion such as warp, tilt, and exfoliation of the disc substrates when the optical disc D is manufactured.

SUMMARY OF THE INVENTION

The invention has been made to solve the foregoing problems.

That is, it is an object of the invention to provide a method of and an apparatus for curing an optical disc D capable of curing an ultraviolet curing resin R serving as an adhesive efficiently even if the optical disc D employs disc substrates through which ultraviolet does not transmit.

It is another object of the invention to provide a method and an apparatus for curing an optical disc D capable of curing an ultraviolet curing resin R serving as an adhesive efficiently even if the optical disc D employs disc substrates through which ultraviolet hardly transmits.

It is still another object of the invention to provide a method and an apparatus for curing an optical disc D capable of curing an ultraviolet curing resin R serving as an adhesive efficiently and uniformly if the optical disc D employs disc substrates on which printing or the like is applied.

To achieve the above objects, the inventors of this application endeavored themselves to study the foregoing problems and have found that an ultraviolet curing resin R serving as an adhesive can be efficiently cured by limiting the direction of irradiation of ultraviolet relative to the optical disc D.

That is, a first aspect of the invention is an apparatus for curing an optical disc D placed on a rotary holding table and formed by bonding a first disc substrate and a second disc substrate by the medium of an ultraviolet curing resin R, and it is characterized in comprising an ultraviolet irradiation peripheral unit disposed around the rotary holding table for irradiating ultraviolet from the peripheral surface of the optical disc D toward the inner portion thereof so as to cure the ultraviolet curing resin.

A second aspect of the invention is an apparatus for curing an optical disc D formed by bonding a first disc substrate and a second disc substrate by the medium of an ultraviolet curing resin R, and it is characterized in comprising an ultraviolet irradiation peripheral unit disposed around the rotary holding table for irradiating ultraviolet from the peripheral surface of the optical disc D toward the inner portion thereof so as to cure the ultraviolet curing resin, and an ultraviolet irradiation central unit disposed at the center of the rotary holding table for irradiating ultraviolet from the central hole of the optical disc D toward the outer portion thereof so as to cure the ultraviolet curing resin.

A third aspect of the invention is the apparatus for curing an optical disc D characterized in that the ultraviolet irradiation peripheral unit in the first or second aspect of the invention comprises a plurality of divided units which are disposed around the rotary holding table.

A fourth aspect of the invention is the apparatus for curing an optical disc D characterized in that the ultraviolet irradiation peripheral unit in the first or second aspect of the invention comprises a plurality of divided units which are disposed around the rotary holding table, and wherein the irradiation direction of ultraviolet is changeable to a vertical or horizontal direction.

A fifth aspect of the invention is the apparatus for curing an optical disc D characterized in further comprising a boss elastically pressed and journaled by and attached to the central portion of the rotary holding table in the first or second aspect of the invention.

A sixth aspect of the invention is the apparatus for curing an optical disc D characterized in that the boss in the first or second aspect of the invention is provided on the center of the rotary holding table to be movable toward or away from the surface of the rotary holding table by suction force.

A seventh aspect of the invention is the apparatus for curing an optical disc D characterized in further comprising suction means provided on the rotary holding table and connected to a negative pressure source, wherein the suction means allows the boss to move toward or away from the rotary holding table and the optical disc D to be placed on and attached to the rotary holding table.

An eighth aspect of the invention is the apparatus for curing an optical disc D characterized in further comprising a press member for pressing the first and second disc substrates to each other.

A ninth aspect of the invention is the apparatus for curing an optical disc D characterized in that the ultraviolet irradiation peripheral unit is divided into eight, and wherein two divided bodies 2A of the ultraviolet irradiation peripheral unit 2 are arranged in parallel with each other and eight units are disposed square as a whole.

A tenth aspect of the invention is the apparatus for curing an optical disc D characterized in that the ultraviolet irradiation peripheral unit is clamped between the rotary holding table and the fastening member.

An eleventh aspect of the invention is the apparatus for curing an optical disc D characterized in that the ultraviolet irradiation central unit can be inserted into and detached from the central hole of the optical disc D which is set on the rotary holding table when it moves vertically.

A twelfth aspect of the invention is a method of curing an optical disc D formed by bonding a first disc substrate and a second disc substrate by the medium of an ultraviolet curing resin R comprising the steps of irradiating ultraviolet from the peripheral surface of the optical disc D toward the inner portion thereof while the optical disc D is rotated so as to cure the ultraviolet curing resin R.

A thirteenth aspect of the invention is a method of curing an optical disc D formed by bonding a first disc substrate and a second disc substrate by the medium of an ultraviolet curing resin R comprising the steps of irradiating ultraviolet from the peripheral surface of the optical disc D toward the inner portion thereof and also irradiating ultraviolet from the center of the optical disc D toward the outer portion thereof while the optical disc D is rotated so as to cure the ultraviolet curing resin R.

A fourteenth aspect of the invention is the method of curing an optical disc D characterized in that the irradiation of ultraviolet from the peripheral surface of the optical disc D toward the inner portion thereof is effected by an ultraviolet irradiation peripheral unit which is divided into plural units and the plural units are independent of one another.

A fifteenth aspect of the invention is the method of curing an optical disc D characterized in that the irradiation of ultraviolet from the peripheral surface of the optical disc D toward the inner portion thereof is effected by the ultraviolet irradiation peripheral unit which is divided into plural units, and the plural units are independent of one another for preventing localized shaded areas of ultraviolet due to foreign matter which is mixed in the ultraviolet curing resin R.

A sixteenth aspect of the invention is the method of curing an optical disc D characterized in that ultraviolet is irradiated while the first and second disc substrates are pressed against each other.

Although the invention has been described above, it is possible to employ a structure of the apparatus for curing an optical disc composed of a combination of the foregoing first to eleventh aspects of the invention or a structure of the method of curing an optical disc composed of a combination of the foregoing twelfth to sixteenth aspects of the invention.

Inasmuch as the invention has the above structure, it operates as follows.

Ultraviolet is irradiated from the peripheral surface of the optical disc D toward the inner portion thereof after the two disc substrates which are bonded to each other by the medium of the ultraviolet curing resin R are placed on the rotary holding table while the rotary holding table is rotated.

Ultraviolet is irradiated from the peripheral surface of the optical disc D toward the inner portion thereof and from the center, i.e., the central hole of the optical disc D, toward the outer portion thereof after the two disc substrates which are bonded to each other by the medium of the ultraviolet curing resin R are placed on the rotary holding table while the rotary holding table is rotated.

BRIEF DESCRIPTION OF THE DRAWINGS

FIG. 1(A) and FIG. 1(B) are views for respectively explaining a principle of irradiation of ultraviolet, wherein FIG. 1(A) is a sectional view of an optical disc D, and FIG. 1(B) is a front view of the same;

PREFERRED EMBODIMENTS OF THE INVENTION

The method of and apparatus for curing an optical disc D according to preferred embodiments of the invention are now described hereinafter with reference to the attached drawings.

First of all, an optical disc D is manufactured by a step of forming a first disc substrate by an injection molding machine using a stamper manufactured by a mastering step, a step of forming a reflection film and a protection film on a signal surface formed in the first disc substrate, and a step of bonding the first disc substrate with the second disc substrate and integrating the first and second disc substrates with each other. The method of and apparatus for curing an optical disc D is preferably used after the step of bonding in the manufacturing process of the optical disc D.

The bonding step is described in more detail for precaution's sake before explaining the apparatus for curing an optical disc D.

"Bonding" means that two disc substrates are placed, one over the other by the medium of an adhesive (e.g., ultraviolet curing resin), and it does not matter whether the adhesive is cured or not.

Figure 8:
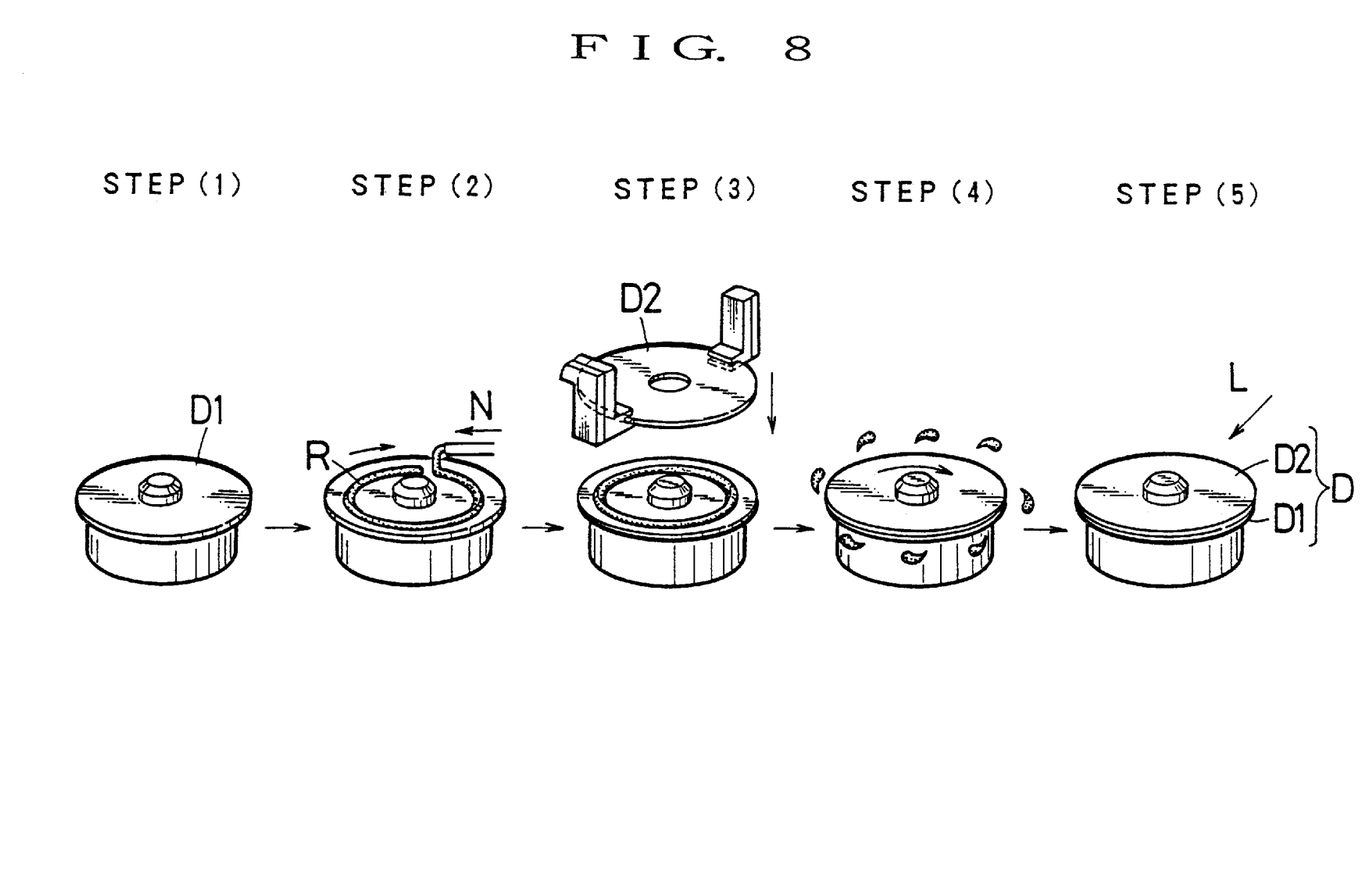
FIG. 8 shows a bonding step in a schematic processing of the optical disc D.

FIG. 8 shows a bonding step in a schematic processing of the optical disc D.

In the first step, a first disc substrate D1 having a signal surface thereon is positioned on an upper surface of a rotary holding table.

In the second step, an ultraviolet curing resin R (adhesive) is applied to the first disc substrate D1.

For example, the ultraviolet curing resin R is applied to the upper surface of the first disc substrate D1 through a discharge nozzle N while the rotary holding table is rotated at a low speed. By this, the ultraviolet curing resin R is drawn in a ring-shape on the upper surface of the first disc substrate D1.

In the third step, a second disc substrate D2 is placed on the first disc substrate D1 to which the ultraviolet curing resin R is applied.

In the fourth step, the rotary holding table is rotated at high speed (preferably not less than 2000 rpm) in a state where the first and second disc substrates D1 and D2 are placed, one over the other.

When the rotary holding table is rotated at a high speed, the ultraviolet curing resin R is developed between both disc substrates uniformly as a whole. When the second disc substrate D2 is placed on the first disc substrate D1, air which enters between two disc substrates and, air bubbles which are present inherently in the ultraviolet curing resin R are discharged.

In the fifth step, both disc substrates D1 and D2 which are bonded to each other are irradiated with ultraviolet L while they are rotated on the rotary holding table so as to cure the ultraviolet curing resin R.

First Embodiment: FIGS. 1 to 6

A method of and an apparatus for curing an optical disc according to a first embodiment of the invention are now described with reference to FIGS. 1 to 6.

Figure 1:
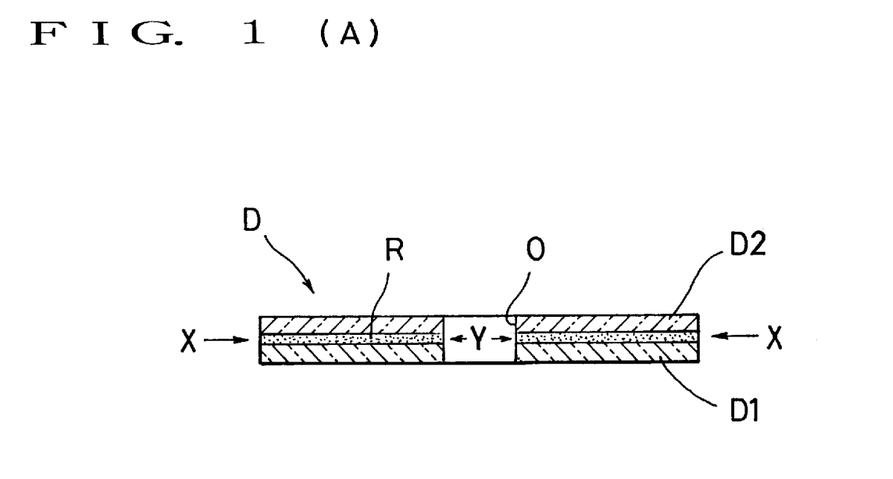

Ultraviolet emitted from an ultraviolet light source, not shown, is irradiated from a peripheral surface of the optical disc D toward the inner portion by the medium of optical transmission cables or parts 7 such as an optical fiber, then it is irradiated from the center (central hole) of the optical disc D toward the outer portion so as to cure the ultraviolet curing resin R (see FIG. 1).

Figure 2:
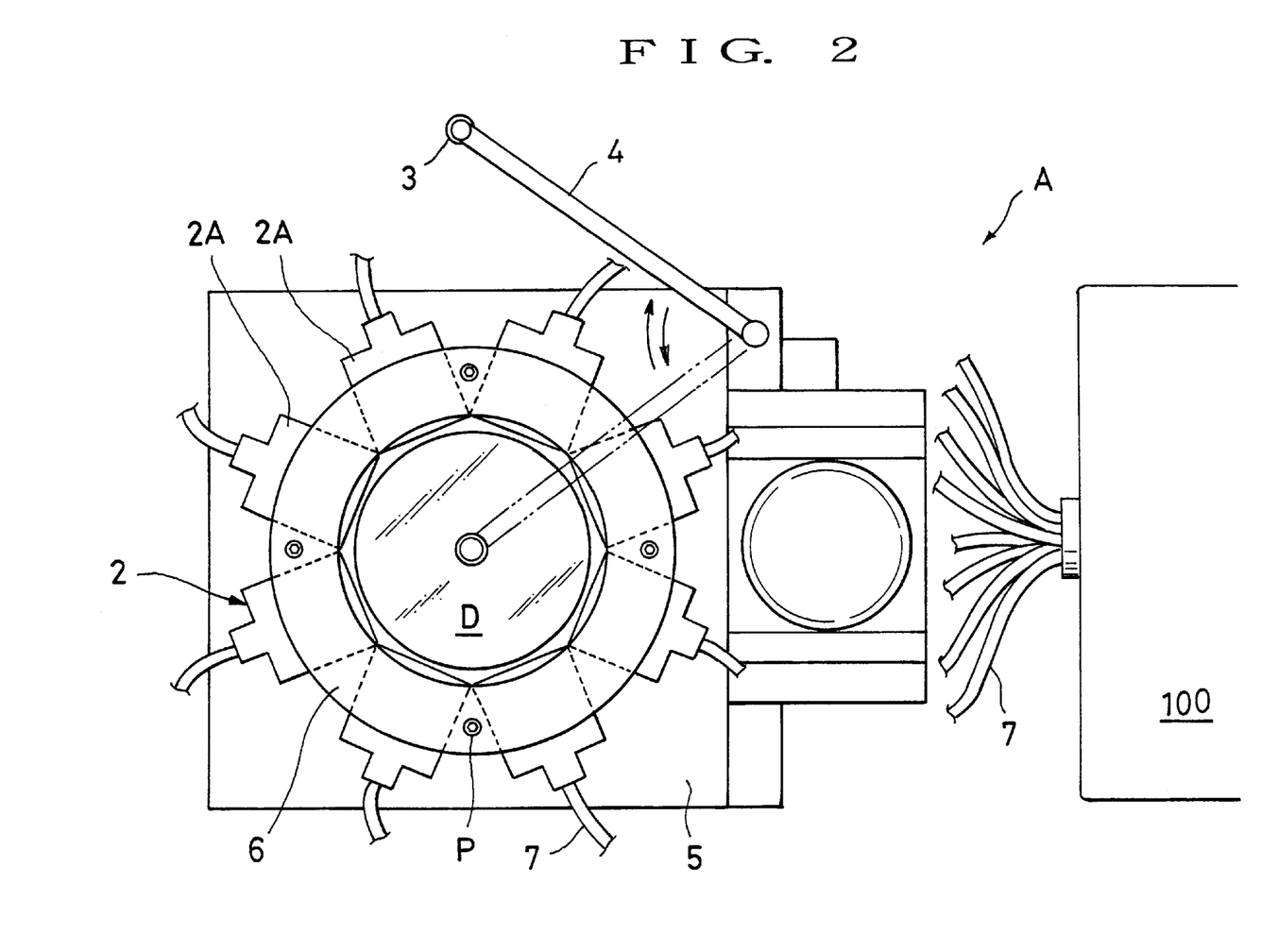
FIG. 2 is a plan view schematically showing the apparatus for curing the optical disc D in FIG. 1.
Figure 3:
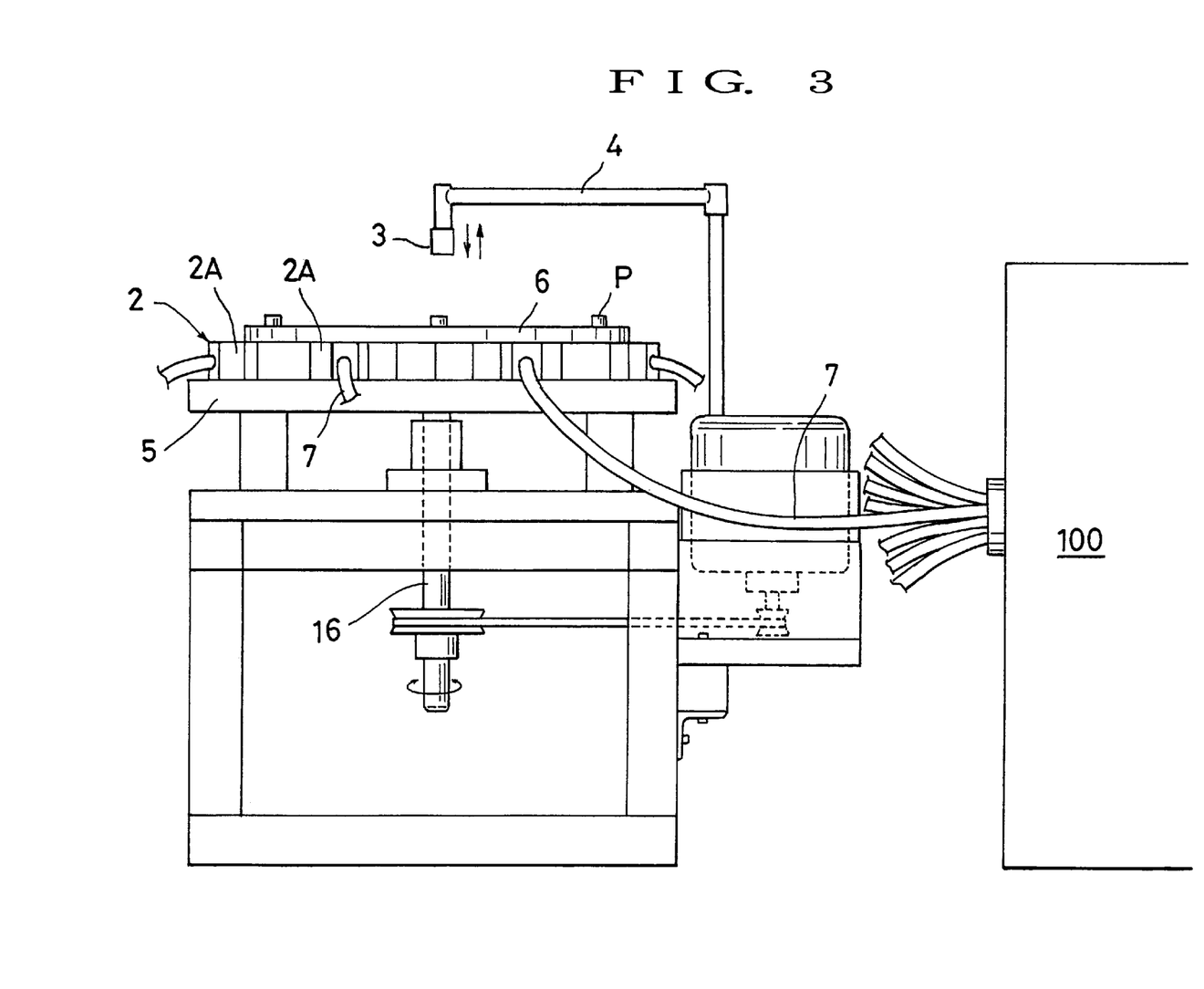
FIG. 3 is a side view schematically showing the apparatus for curing the optical disc D as shown in FIG. 2.

The apparatus for curing an optical disc D is described next with reference to FIGS. 2 to 5. FIGS. 2 and 3 are plan and side views respectively schematically showing the apparatus for curing an optical disc D wherein the optical disc D is irradiated with ultraviolet.

Figure 4:
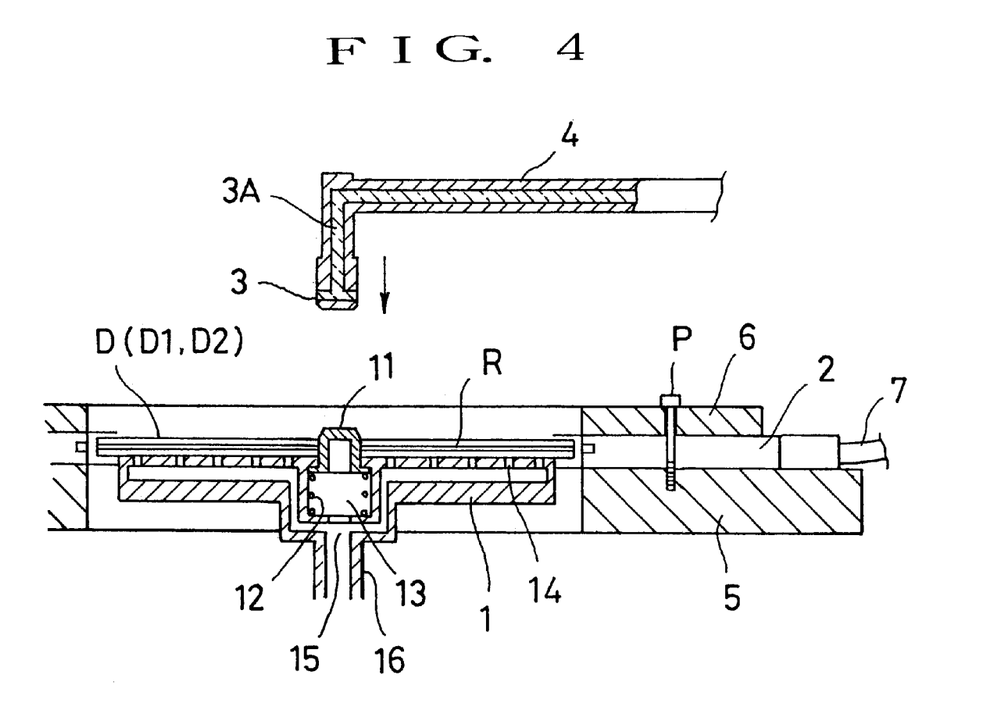
FIG. 4 is a sectional view of the apparatus for curing the optical disc D as shown in FIG. 2 for explaining a state at the time before the optical disc D is irradiated with ultraviolet.
Figure 5:
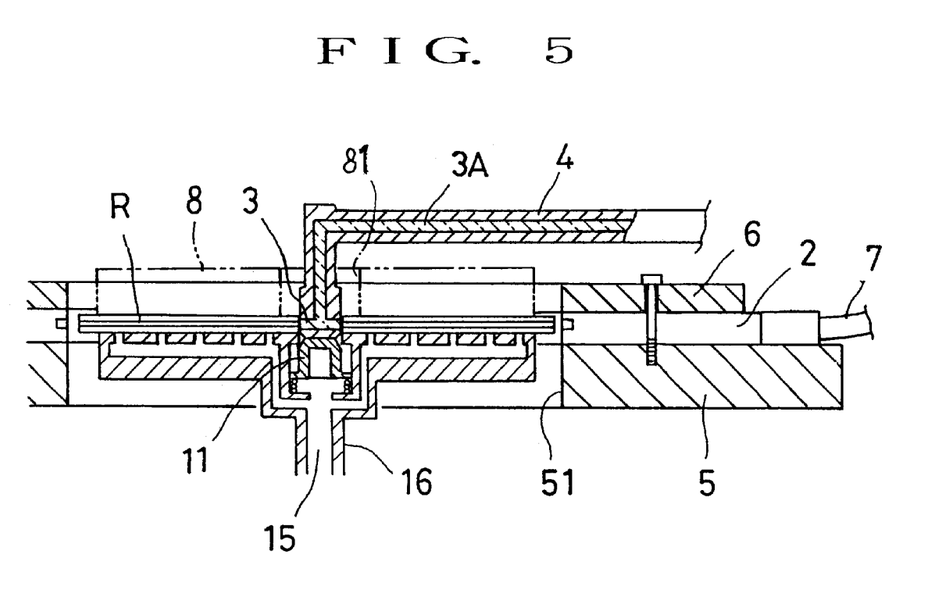
FIG. 5 is a sectional view of the apparatus for curing the optical disc D in FIG. 1 for explaining a state at the time when the optical disc D is irradiated with ultraviolet.

Meanwhile, FIGS. 4 and 5 are sectional views of the apparatus for curing an optical disc D, wherein FIG. 4 shows a state at the time before ultraviolet is irradiated and FIG. 5 shows a state at the time when ultraviolet is irradiated (particularly, FIG. 5 shows a state where a press number 8 as shown in two-dotted one chain line is placed on the optical disc D).

The apparatus for curing an optical disc D comprises mainly a rotary holding table 1 having a boss 11 at the center thereof, a ultraviolet irradiation unit for irradiating ultraviolet from the peripheral surface of the optical disc D toward the inner portion thereof (hereinafter referred to an ultraviolet irradiation peripheral unit 2), and an ultraviolet irradiation unit for irradiating ultraviolet from the central hole of the optical disc D toward outer portion thereof (hereinafter referred to an ultraviolet irradiation central unit 3).

Ultraviolet is transmitted to both the ultraviolet irradiation peripheral unit 2 and ultraviolet irradiation central unit 3 from an ultraviolet light source that is built in a UV irradiation apparatus 100 through optical transmission parts 7.

The rotary holding table 1 is rotatably journaled by a rotary shaft 16 and is disposed at the center of a doughnut-like base table 5, described later.

The rotary holding table 1 has a suction surface at the upper surface thereof for drawing the optical disc D (from the side of a lower disc substrate D1) to hold and fix the optical disc D onto the rotary holding table 1, and the suction operation is effected by suction means including a section passage 15 connected to a negative pressure source, not shown.

As mentioned above, since the boss 11 is attached to the central portion of the suction surface of the rotary holding table 1, the optical disc D is accurately positioned on the rotary holding table 1 by inserting the boss 11 into the central holes 0 of both the disc substrates D1, D2.

The boss 11 is elastically pressed upward and journaled by and attached to a central space 13 of the rotary holding table 1, e.g., by the medium of a spring body 12 so that the boss 11 is movable toward and away from the upper surface of the rotary holding table 1.

When the boss 11 is drawn by suction force, the spring body 12 is compressed and buried in the central space 13 of rotary holding table 1 while the boss 11 can be protruded from the central space 13 when stopping the application of suction force to restore the spring body 12.

The suction operation is effected by suction means including the suction passage 15 communicating with the suction surface for drawing the disc substrates D1, D2. The suction force is preferably set at 40 to 70 kPag.

The ultraviolet irradiation peripheral unit 2 is disposed along the peripheral surface of the rotary holding table 1.

More in detail, the ultraviolet irradiation peripheral unit 2 is divided into multiple units or bodies 2A which are independent of one another and stand side by side uniformly or at a given interval along the peripheral surface of the rotary holding table 1, and a doughnut-like fastening member 6 presses the ultraviolet irradiation peripheral units 2 against the base table 5.

When the divided bodies 2A can be fixed between the fastening member 6 and base table 5, ultraviolet can be irradiated in parallel with both the disc substrates D1, D2, and hence it directly acts on the ultraviolet curing resin R sandwiched between both the disc substrates D1, D2.

Since the doughnut-like fastening member 6 is fixed to the base table 5 by fixing bolts P, the ultraviolet irradiation peripheral unit 2 can be easily removed when the fixing bolts P are loosened.

Accordingly, when the fixing angle of the divided bodies 2A of the ultraviolet irradiation peripheral unit 2 in the right and left directions, i.e. the horizontal direction of ultraviolet is changed, the direction of irradiation of ultraviolet can be changed.

The ultraviolet irradiation peripheral unit 2 is positioned as set forth above and it can irradiate ultraviolet from the peripheral surface of the optical disc D toward the inner portion thereof to cure the ultraviolet curing resin R.

Further, ultraviolet emitted from the UV irradiation apparatus 100 is transmitted to the ultraviolet irradiation peripheral unit 2 using the optical transmission parts 7. Under the circumstances, ultraviolet can be directly and accurately irradiated from the peripheral surface of the optical disc D toward the inner portion thereof to cure the ultraviolet curing resin R.

Figure 6:
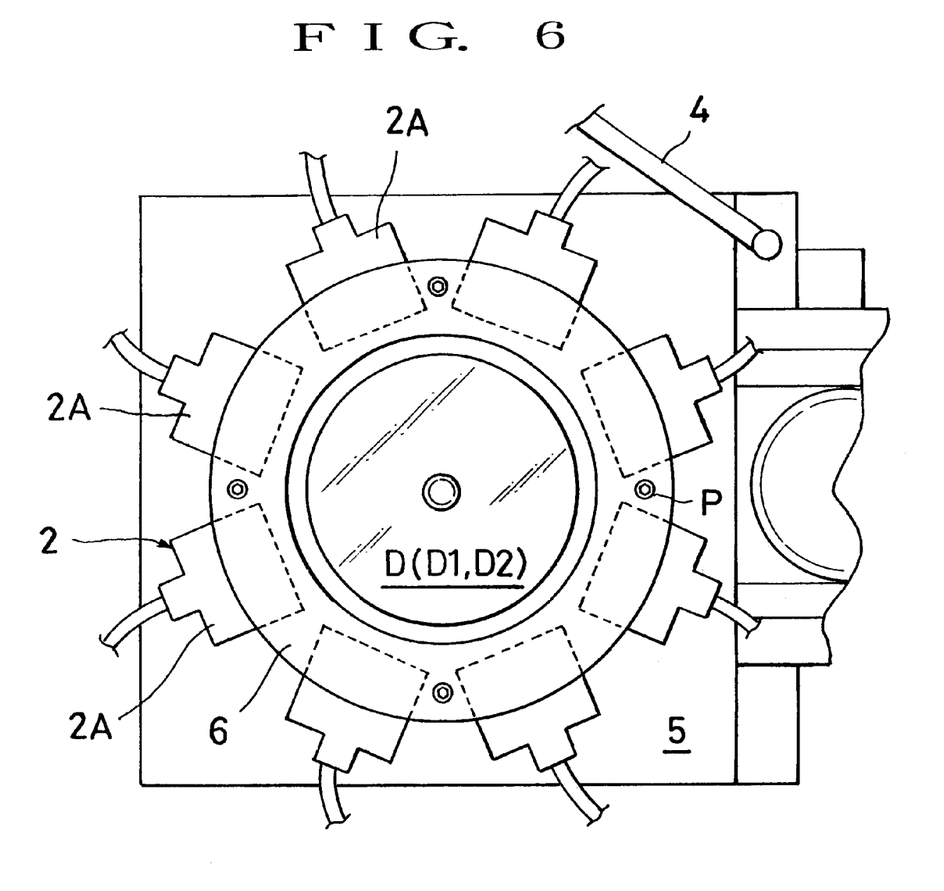
FIG. 6 is a view showing a state where an ultraviolet irradiation peripheral unit is arranged outside the optical disc D.

Although the output of the ultraviolet irradiation peripheral unit 2 can be regulated by a controller of the UV irradiation apparatus 100, the intensity of illumination can be regulated by moving the entire ultraviolet irradiation peripheral unit 2, i.e., divided bodies 2A away from the optical disc by loosening the fixing bolts P as shown in FIG. 6.

It is needless to say that the angle of illumination of ultraviolet relative to the optical disc D can be changed by selecting the angles of disposition of respective divided bodies 2A of the ultraviolet irradiation peripheral unit 2 as set forth above.

Meanwhile, the ultraviolet irradiation central unit 3 is disposed at the center of the rotary holding table 1 and irradiates ultraviolet from the central hole O of the optical disc D to cure the ultraviolet curing resin R.

Ultraviolet can be irradiated in parallel with both the disc substrates D1, D2, and hence it directly acts on the ultraviolet curing resin R sandwiched between both the disc substrates D1, D2.

Ultraviolet is also transmitted from the ultraviolet light source, not shown, built in the UV irradiation apparatus 100 to the ultraviolet irradiation central unit 3 by the medium of the arm-like transmission part 4 (an optical fiber 3A for transmitting ultraviolet is disposed in the arm-like transmission part 4).

As mentioned above, ultraviolet can be irradiated from the center of the optical disc D to the outer portion thereof.

A step of curing the optical disk D by the irradiation of ultraviolet using both the ultraviolet irradiation peripheral unit 2 and ultraviolet irradiation central unit 3 are described in detail above is described next.

As described in FIGS. 4 and 5, disc substrates D1, D2 are placed on the suction surface of the rotary holding table 1.

The press member 8 is placed on both the disc substrates D1, D2 for pressing both the disc substrates D1, D2 against each other as shown by two dotted and chain line.

The press member 8 is provided for pressing both the disc substrates D1, D2 to prevent both the disc substrates D1, D2 from warping or tilting or the like, but it may be dispensed with depending on the kind of an optical disc D.

The press member 8 is formed such that it has a diameter which is slightly smaller than the diameters of both the disc substrates D1, D2, and it has a hole 81 at the center thereof through which the ultraviolet irradiation peripheral unit 2 can irradiate ultraviolet.

The press member 8 is normally preferable to have a weight of 500 to 1000 g.

Since the curing step by irradiating ultraviolet is different from the conventional curing step by irradiating ultraviolet from the upper portion of the optical disc D, it is possible to employ a press member 8 through which light is not transmitted, for example, a metal disc can be employed.

Then, the rotary holding table 1 starts a low speed rotation (preferably about 100 to 200 rpm). Then, ultraviolet is irradiated from the ultraviolet irradiation peripheral unit 2.

Ultraviolet is irradiated from the peripheral surface of the optical disc toward the inner portion thereof so as to cure the ultraviolet curing resin R sandwiched between the disc substrates D1, D2.

Different from the conventional irradiation of ultraviolet from the upper portion of the optical disc toward the optical disc, ultraviolet is directly irradiated toward the ultraviolet curing resin R along the direction of the application of the ultraviolet curing resin R, and the ultraviolet curing resin R can be very efficiently cured by ultraviolet.

Further, ultraviolet is irradiated from the peripheral surface central hole O of the optical disc D while the optical disc D is rotated, and the curing of the ultraviolet curing resin R in all directions can be enhanced.

Meanwhile, ultraviolet is irradiated from the center of the optical disc D toward the outer portion thereof by the ultraviolet irradiation central unit 3. In this case, the arm-like transmission part 4 is turned horizontally and is positioned over the central axis of the optical disc D.

When the arm-like transmission part 4 is lowered, the ultraviolet irradiation central unit 3 is positioned over the central hole O of the optical disc D.

At this time, it is preferable that the boss 11 is buried or lowered downward in the central space 13 of the rotary holding table 1 by suction so as not to impede the ultraviolet irradiation central unit 3 from being oriented over the central hole O of the optical disc.

It is needless to say that the boss 11 can be depressed directly by the ultraviolet irradiation central unit 3.

The ultraviolet irradiation central unit 3 thus positioned in the central hole O of the optical disc D irradiates ultraviolet from the center of the optical disc D toward the outer portion thereof so as to cure the ultraviolet curing resin R sandwiched between both the disc substrates D1, D2.

When using both the irradiation means of the ultraviolet irradiation peripheral unit 2 and ultraviolet irradiation central unit 3, ultraviolet is preferably irradiated at the same time from both the irradiation means.

It is needless to say that the ultraviolet curing resin R serving as an adhesive can be sufficiently cured even by the irradiation of ultraviolet only from ultraviolet irradiation peripheral unit 2 toward the optical disc D.

However, if the irradiation of ultraviolet from the ultraviolet irradiation central unit 3 is added to that from the ultraviolet irradiation peripheral unit 2, more efficient curing of the ultraviolet curing resin R can be effected.

That is, light or ultraviolet emitted from the UV irradiation apparatus 100 is transmitted to the optical transmission parts 7 or the like and it is irradiated toward the ultraviolet curing resin R sandwiched between disc substrates D1, D2 from the ultraviolet irradiation peripheral unit 2 or both the ultraviolet irradiation peripheral unit 2 and ultraviolet irradiation central unit 3.

Figure 7:
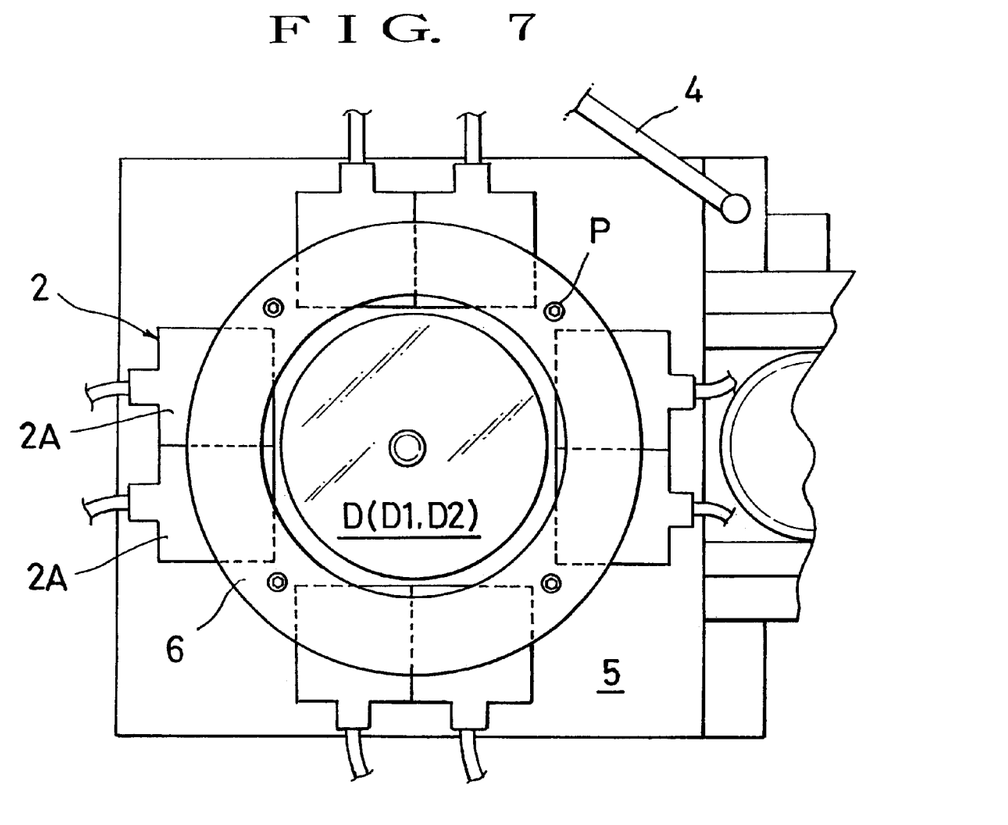
FIG. 7 is a view showing a state where divided ultraviolet irradiation peripheral units are paired and respective pairs are arranged square as a whole.

Second Embodiment: FIG. 7

A ultraviolet irradiation peripheral unit 2 is divided in plural units or bodies and disposed along the peripheral surface of the optical disc D so as to irradiate ultraviolet from the peripheral surface of the optical disc D toward the inner portion thereof.

As the divided units or bodies 2A of the ultraviolet irradiation peripheral unit 2, it is particularly advantageous that pairs of divided bodies 2A, which are obtained by dividing the ultraviolet irradiation peripheral unit 2 into eight pieces, are arranged in parallel with each other and disposed so as to define square as shown in FIG. 7.

The reason is that if the divided bodies 2A of the ultraviolet irradiation peripheral unit 2 are disposed particularly in the direction of the central portion of the optical disc D, for example, if a fine foreign matter such as dust is mixed in the ultraviolet curing resin R serving as an adhesive, an area inside of the location of the foreign matter in the central direction becomes a shade S of ultraviolet so that the ultraviolet curing resin R in the area of the shade S is delayed in curing.

That is, since the shade S of ultraviolet is always formed inside the location of the foreign matter during irradiation of ultraviolet, the shade S is localized as a concentrated area of ultraviolet. Accordingly, the divided bodies 2A of the ultraviolet irradiation peripheral unit 2 are disposed as shown in FIG. 7, and it is possible to dispense with the shade S that is localized inside the location of the foreign matter in the central direction thereof. Accordingly, the curing of the ultraviolet curing resin R in the area of the shade S can be enhanced to obtain a uniform ultraviolet curing resin R.

Since the angle of fixing the divided bodies 2A of the ultraviolet irradiation peripheral unit 2 between the base table 5 and fastening member 6 can be changed, it is possible to change the direction of irradiation by the ultraviolet irradiation peripheral unit 2, thereby excluding the localized shade S.

Although the invention has been described with reference to the first and second embodiments, it is not limited thereto and can be modified variously.

For example, the design of the shape of the arm-like transmission part can be appropriately changed if it attains the function of the ultraviolet irradiation central unit.

Further, the number of the divided bodies of the ultraviolet irradiation peripheral unit is not limited to eight but can be appropriately selected.

Still further, if the ultraviolet irradiation central unit is not used, it is not necessary to configure the boss so as to move toward and away from the upper surface of the rotary holding table, but instead may be fixed to the rotary holding table while the boss protrudes from the rotary holding table.

The angle of vertical direction of irradiation of ultraviolet by the ultraviolet irradiation peripheral unit can be changed. In this case, the angle of vertical direction of irradiation of ultraviolet can be easily changed by enlarging an interval between the base table and presser member and inserting a tapered spacer between the ultraviolet irradiation peripheral unit and the base table or presser member.

According to the invention, the ultraviolet curing resin serving as an adhesive can be efficiently cured relative to the disc substrates through which ultraviolet does not transmit.

Further, the ultraviolet curing resin serving as an adhesive can be efficiently cured relative to the disc substrates through which ultraviolet hardly transmits.

Still further, the ultraviolet curing resin serving as an adhesive can be efficiently and uniformly cured relative to the disc substrates on which printing or the like is applied.

Further, when the ultraviolet irradiation peripheral unit and the ultraviolet irradiation central unit are used, the ultraviolet curing resin can be efficiently cured.

Still further, productivity can be markedly improved because the ultraviolet curing resin can be efficiently cured.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An apparatus for curing an optical disc formed by bonding a first disc substrate and a second disc substrate with one another with an ultraviolet curing resin, said apparatus comprising:

a base table;

a holding table rotatably mounted on said base table for supporting the optical disc;

a fastening member positioned above said base table;

a plurality of separate peripheral ultraviolet irradiation units disposed about a periphery of said holding table for irradiating ultraviolet from a peripheral surface of the optical disc toward an inner portion thereof to cure the ultraviolet curing resin disposed between the first and second disc substrates, said peripheral irradiation units being clamped between said base table and said fastening member.

2. An apparatus for curing an optical disc formed by bonding a first disc substrate and a second disc substrate to one another with an ultraviolet curing resin, said apparatus comprising:

a base table defining an opening therein;

a holding table rotatably disposed within said opening of said base table for supporting the optical disc;

a fastening member positioned above said base table;

a plurality of peripheral ultraviolet irradiation units disposed around a periphery of said holding table for irradiating ultraviolet from a peripheral edge surface of the optical disc toward a portion thereof disposed inwardly of the peripheral edge to cure the ultraviolet curing resin, said fastening member being disposed to press said peripheral irradiation units from above against said base table; and a central ultraviolet irradiation unit disposed at a center of said holding table for irradiating ultraviolet from a central hole of the optical disc toward a portion thereof disposed outwardly of the central hole to cure the ultraviolet curing resin.

3. The apparatus according to claim 1 or 2 wherein said peripheral irradiation units are mounted on said base table such that the direction of irradiation is changeable to a vertical or horizontal direction.

4. The apparatus according to claim 1 or 2 further including a boss attached to said holding table in a central area thereof, said boss being biased in an upward direction by a spring so as to project upwardly from said holding table and into a central hole of the optical disc.

5. The apparatus according to claim 4 wherein said boss is movable downwardly and away from an upper surface of said holding table against the biasing force of said spring by suction force.

6. The apparatus according to claim 5 further including a suction device provided on said holding table and connected to a negative pressure source, said suction device including a passage defined in said holding table which applies suction to the optical disc to position same on said holding table and which additionally applies suction to said boss to retract same downwardly.

7. The apparatus according to claim 1 or 2 further including a pressing member disposed above said holding table to press the first and second disc substrates against one another.

8. The apparatus according to claim 1 or 2 further including eight of said peripheral irradiation units disposed about said periphery of said holding table, wherein said peripheral irradiation units are grouped in pairs about said periphery such that the two peripheral irradiation units in each pair are parallel with one another, and adjacent pairs of said peripheral irradiation units are arranged at about a 90 degree angle with one another so as to define a generally square configuration when viewed from above said holding table.

9. The apparatus according to claim 1 further including a central ultraviolet irradiation unit which is insertable into a central hole of the optical disc so as to irradiate ultraviolet from the central hole outwardly towards the peripheral surface.

10. The apparatus according to claim 2 wherein said central irradiation unit is vertically movable toward and away from said holding table and is configured for removable insertion into a central hole of the optical disc positioned on said holding table.

11. The apparatus according to claim 10 wherein a boss is provided in an upwardly opening recess defined in said holding table and a biasing member is disposed in said recess to normally urge said boss upwardly so as to project beyond an upper surface of said holding table and into the central hole of the optical disc, and a suction device is provided on said holding table for applying a suction force to the optical disc to fix same on said holding table, said suction device additionally applying a suction force to said recess so as to retract said boss downwardly and allow insertion of said central irradiation unit into the central hole of the optical disc.

12. The apparatus according to claim 1 or 2 wherein said peripheral irradiation units are arranged adjacent said periphery of said holding table in adjacent side-by-side relation with one another and are sandwiched between said fastening member and said base table.

13. The apparatus according to claim 1 or 2 wherein said fastening member is fixed to said base table by bolts.

14. A method of curing an optical disc having first and second disc substrates which are bonded to one another by an ultraviolet curing resin, said method comprising the steps of:
    providing a rotatable holding table;
    providing a plurality of separate and independent peripheral ultraviolet irradiation units about a periphery of the holding table;
    positioning the optical disc on the holding table;
    rotating the holding table to rotate the optical disc; and
    irradiating ultraviolet from an outer peripheral surface of the optical disc toward an inner portion thereof disposed inwardly of the peripheral surface with the peripheral irradiation units during rotation of the optical disc to cure the ultraviolet curing resin disposed between the first and second disc substrates.

15. A method of curing an optical disc having first and second disc substrates which are bonded to one another by an ultraviolet curing resin disposed therebetween, said method comprising the steps of:
    providing a rotatable holding table;
    providing a plurality of distinct and independent peripheral ultraviolet irradiation units about a periphery of the holding table;
    providing a central ultraviolet irradiation unit adjacent a center of the holding table;
    positioning the optical disc on the holding table rotating the holding table to rotate the optical disc; and
    curing the ultraviolet curing resin during rotation of the optical disc by:
        irradiating ultraviolet from an outer peripheral surface of the optical disc toward an inner portion thereof with the peripheral irradiation units; and
        irradiating ultraviolet from a center of the optical disc toward an outer portion thereof with the central irradiation unit.

16. The method according to claim 14 or 15 further including arranging the peripheral irradiation units on the holding table so as to prevent shadows of concentrated ultraviolet from forming due to foreign matter present in the ultraviolet curing resin.

17. The method according to claim 14 or 15 further including pressing the first and second disc substrates against one another during said step of irradiating.

18. The method according to claim 14 or 15 further including providing a base table in which the holding table is rotatably disposed and a fastening member above the base table, and clamping the peripheral irradiation units against the base table with the fastening member.

19. The method according to claim 15 further including inserting the central irradiation unit into a central opening of the optical disc and irradiating ultraviolet from the center of the optical disc toward an outer portion thereof.

* * * * *